(12) United States Patent
Singh et al.

(10) Patent No.: US 12,494,011 B2
(45) Date of Patent: Dec. 9, 2025

(54) RAY TRACING HARDWARE AND METHOD

(71) Applicant: Bolt Graphics, Inc., Minneapolis, MN (US)

(72) Inventors: Darwesh Singh, Minneapolis, MN (US); Rufino Olay, Minneapolis, MN (US)

(73) Assignee: Bolt Graphics, Inc., Minneapolis, MN (US)

( * ) Notice: Subject to any disclaimer, the term of this patent is extended or adjusted under 35 U.S.C. 154(b) by 49 days.

(21) Appl. No.: 17/747,871

(22) Filed: May 18, 2022

(65) Prior Publication Data

US 2023/0410403 A1    Dec. 21, 2023

Related U.S. Application Data

(60) Provisional application No. 63/202,732, filed on Jun. 22, 2021, provisional application No. 63/201,901, filed on May 18, 2021.

(51) Int. Cl.
*G06T 15/00* (2011.01)
*G06T 15/06* (2011.01)

(52) U.S. Cl.
CPC ............ *G06T 15/005* (2013.01); *G06T 15/06* (2013.01)

(58) Field of Classification Search
None
See application file for complete search history.

(56) References Cited

U.S. PATENT DOCUMENTS

| | | | |
|---|---|---|---|
| 7,012,604 | B1 | 3/2006 | Christie et al. |
| 7,773,087 | B2 | 8/2010 | Fowler et al. |
| 7,830,379 | B2 | 11/2010 | Peterson et al. |
| 7,969,434 | B2 | 6/2011 | Peterson et al. |
| 8,237,711 | B2 | 8/2012 | Mccombe et al. |
| 8,284,188 | B1 | 10/2012 | Lauterbach et al. |
| 8,411,082 | B1 * | 4/2013 | Cook ............... G06T 15/06 |
| | | | 345/419 |
| 9,965,889 | B2 | 5/2018 | Hur et al. |
| 10,559,125 | B2 | 2/2020 | Deshwal et al. |
| 10,580,189 | B2 | 3/2020 | Akenine-Moller et al. |

(Continued)

OTHER PUBLICATIONS

Tero Karras, Technical Blog, Technical Walkthrough, "Thinking Parallel, Part II: Tree Traversal on the GPU", 1 page, Nov. 26, 2012.

*Primary Examiner* — David H Chu
(74) *Attorney, Agent, or Firm* — Patterson + Sheridan, LLP

(57) ABSTRACT

A ray tracing system and method of operation comprising one or more memories configured to store data used by the ray tracing system and one or more memory interfaces configured read and or write data to the one or more memories. A ray tracing engine, in communication with the memory via the one or more memory interfaces, comprising one or more ray generation modules configured to generate ray data defining rays. Also part of the ray tracing engine are one or more acceleration structure generators configured to process geometry data that is stored in the one or more memories to create an acceleration structure based on the geometry data. One or more intersection testers are configured to compare the ray data to the acceleration structure to determine which rays intersect which elements in the acceleration structure and generate secondary ray data, such that the secondary rays represent reflections.

7 Claims, 10 Drawing Sheets

(56) References Cited

U.S. PATENT DOCUMENTS

| | | |
|---|---|---|
| 11,200,725 B2 | 12/2021 | Muthler et al. |
| 2008/0129734 A1 | 6/2008 | Seung-Woo et al. |
| 2009/0027382 A1* | 1/2009 | Yang ................... G06T 15/08 |
| | | 345/419 |
| 2009/0106530 A1 | 4/2009 | Lauterbach et al. |
| 2009/0225081 A1* | 9/2009 | Keller ................... G06T 15/06 |
| | | 345/426 |
| 2016/0005210 A1* | 1/2016 | Borodavka ............ G06T 15/06 |
| | | 345/419 |
| 2021/0327118 A1* | 10/2021 | Varadarajan ............. G06T 1/20 |
| 2022/0350606 A1* | 11/2022 | King ................ G06F 9/30038 |

* cited by examiner

RAY TRACING HARDWARE AND METHOD

FIELD OF THE INVENTION

The invention relates to ray tracing and in particular to ray tracing hardware and method of operation.

RELATED ART

Ray tracing is a technique for modeling light rays in graphic applications, such as for rendering algorithms used to generate digital images. Ray tracing is a valuable tool when generating digital images. Ray tracing is capable of simulating a variety of optical effects, such as reflection, refraction, soft shadows, scattering, depth of field, motion blur, caustics, ambient occlusion and dispersion phenomena (such as chromatic aberration).

Optical ray tracing describes a method for producing visual images constructed in 3D computer graphics environments by tracing a path from an imaginary eye through each pixel in a virtual screen, and calculating which objects the ray interacts with in the scene to determine brightness and color of scene objects. In addition, reflections of the rays are calculated to determine the intensity of the reflection and which other objects, if any, the ray interacts with in the scene.

Scenes in ray tracing are described mathematically by a programmer or by a visual artist as scene geometry. Scenes may also incorporate data from images and models captured by means such as digital photography. In addition, surfaces are defined with a texture which associates a color, reflectivity, and surface characteristics for the various scene surfaces.

During processing each ray is tested for intersection with the objects in the scene. Once the nearest object has been identified, the algorithm will estimate the incoming light at the point of intersection, examine the material properties of the object, and combine this information to calculate the final color of the pixel.

Ray tracing was first deployed for applications where taking a relatively long time to render was acceptable, such as in still computer-generated images, film and television visual effects. However, as the amount of content to be processed increased, prior art ray tracing systems and methods are too inefficient. For example, in an animated movie, the ray tracing can take years to process using existing technology. As can be appreciated, this is far too long a time period. The result for the long processing duration is due to the configuration of the existing ray trace systems and amount of data.

In a typical animated movie frame, there are 24 frames per second. Moreover, there are typically 1 to 8000 rays projected through each pixel of the frame into the scenes to test for interaction with the scene geometry. Each frame may have over 100 million geometric features that define the scene, and each ray must be tested for interaction with each geometric feature in the scene. The computational complexity is enormous and current software-based systems. As a result, there is a need for an improved ray tracing system and method.

SUMMARY

To overcome the drawbacks of the prior art and provide additional benefits, disclosed is a ray tracing system. In one example embodiment the system includes one or more memories configured to store data used by the ray tracing system and one or more memory interfaces configured read and or write data to the one or more memories. A ray tracing engine communicates with at least one of the one or more memories. The ray tracing engine comprises one or more ray generation modules configured to generate ray data defining rays. Also part of the system is one or more acceleration structure generators configured to process geometry data that is stored in the one or more memories to create an acceleration structure based on the geometry data. One or more intersection testers are also provided and configured to compare the ray data to the acceleration structure to determine which rays intersect which elements in the acceleration structure and generate secondary ray data, such that the secondary rays represent reflections.

In one embodiment, the one or more ray generation modules, the one or more acceleration structure generators, and the one or more intersection testers are configured in hardware. The geometry data defines a scene within a frame. The acceleration structure generator may be configured to generate a tree structure from the geometry data to reduce processing time of the intersection testers. The ray tracing system may further comprise a spatial coherence engine configured to sort the secondary rays. In one embodiment, at least one of the one or more memories is a cache memory. It is contemplated that the acceleration structure may be an octree that supports multiple types of primitives.

Also disclosed is a ray tracing system for calculating ray tracing within a computer generated scene comprising one or more integrated circuits. The ray tracing system may include a memory interface configured to perform read/write operations with at least one memory. A ray generation module is configured to generate ray data representing rays. An acceleration structure generation module is configured to process scene geometry stored in a memory, accessible by the memory interface, to generate an acceleration structure. Also part of this embodiment is at least one intersection tester module comprising at least one bounding volume intersection tester module configured to compare ray data, representing a ray, with bounding volumes for bounding volume intersections, and at least one primitive intersection module configured to, responsive to an intersection between a ray and a bounding volumes, compare ray data with one or more primitives primitive intersections.

In one embodiment, the one or more primitives comprise two or more different types of primitives. The memory interface may be configured to access a cache memory. The system may further comprise a spatial coherence module included in the one or more integrated circuits, the spatial coherence module configured to: receive secondary ray data from the intersection tester module, processing the secondary ray data to generate sorted and batched secondary rays, and provide the sorted and batched secondary rays to at least one of the intersection tester modules for further processing. In one configuration, the ray tracing system further comprises an accelerated shader module included in the one or more integrated circuits, the accelerated shader module comprising fixed-function hardware logic. In one embodiment, the acceleration structure comprises an octree supporting a variety of primitive types and is generated using fixed-function hardware logic.

Also disclosed is a method for calculating ray tracing data for use in a computer generated scene comprising receiving and storing in memory geometry data representing elements in a computer generated scene. The method also receives and stores in memory ray parameters, and then processing the ray parameters with a ray generation module to generate ray data. Also occurring is the processing the geometry data with an acceleration structure generation module to generate an acceleration structure and also processing the ray data and the acceleration structure with one or more intersection tester modules to calculate primary intersections between ray data and elements of the acceleration structure. Then, using the intersections, calculating secondary ray data. Also occurring is the sorting and batching of secondary rays and providing the secondary rays to at least one of the intersection tester modules to calculate secondary intersections between secondary ray data and elements of the acceleration structure. This method of operation outputs and stores pixel data in memory such that the pixel data represents pixel values which can be used to represent the scene on a display.

In one embodiment, if the intersection tester modules are unable to process additional ray data, the ray generation module stops generating rays until the intersection tester modules are able process ray data. It is contemplated that at least some of the memory is cache memory. This method of operation further comprises, with a spatial coherence module, receiving secondary ray data from the intersection tester module and processing the secondary ray data to generate sorted and batched secondary rays, and then providing the sorted and batched secondary rays to at least one of the intersection tester modules for further processing.

In one embodiment, an accelerated shader module generates the pixel data. It is contemplated that the acceleration structure may comprise an octree supporting a variety of primitive types and is generated using fixed-function hardware logic.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Disclosed herein is a hardware base ray tracing system and implements the ray tracing functions in hardware. In one embodiment, the ray tracing system is implemented in a system on a chip configuration. In other embodiments, the ray tracing hardware may be distributed to different chips, packaged together or separately.

Figure 1:
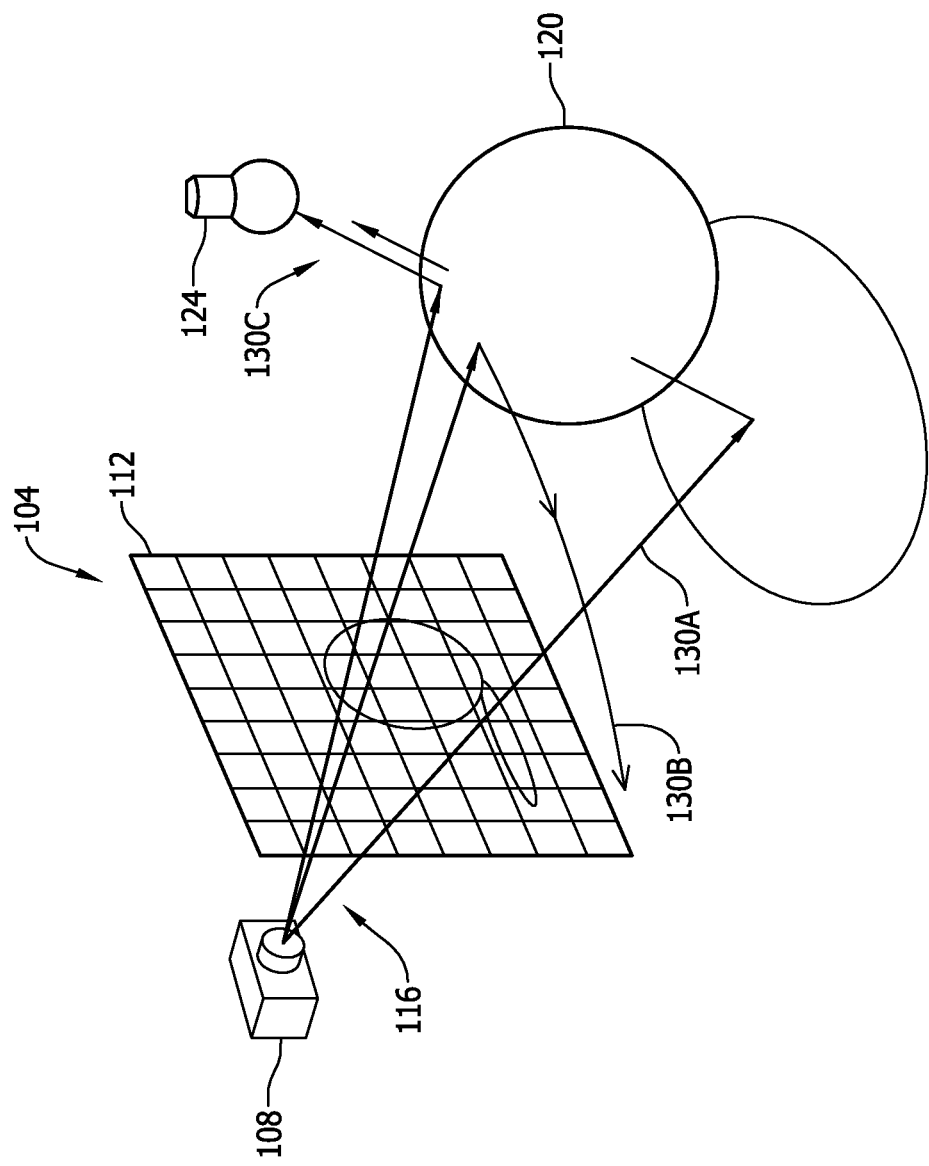
FIG. 1 illustrates an exemplary ray tracing conception diagram provided to aid in understanding.

FIG. 1 illustrates an exemplary ray tracing conception diagram provided to aid in understanding. In this example conceptional environment, a camera 108 is positioned in front of a screen 104 having a number of pixels (represented as squares). Rays appearing to extend from the camera, be projected from a simulated camera, or a viewer's perspective are injected into the scene to determine which elements of the scene the rays intersect. Two or more rays may be projected from the camera through each pixel. It should be noted that actual light rays are not projected from the camera, but instead this is a conceptualization of the processing that occurs.

Each frame of the image contains scene elements 120, referred to herein as geometry represented by geometry data. The frame or scene also includes light sources 124. It is determined which geometry elements 120, 124 the rays 116 will intersect and how the rays will interact with the elements. As is understood, the elements may be represented by a number of smaller elements, referred to as primitives. The smaller elements that are arranged or mapped over a surface to represent the larger element are referred to as primitives. A triangle is an exemplary type of primitive such that thousands of smaller triangles may be mapped over an item's surface to represent the surface.

A number of rays 130A may miss the geometry element 120 while other rays 130B may strike the geometry element. Other rays 130C may reflect from the geometry element 120 to a light source 124 which is also defined in the geometry. Each geometric element 120, 124 may be defined with a texture that defines the geometry element's color and texture, as well as other possible characteristics. Processing and data generation occurs for each ray, pixel, geometry/texture interactions to generate complex shading, color, and lighting for the frame which causes the frame to look realistic. This processing occurs frame by frame to generate image data from the ray data, texture data, and scene geometry.

Figure 2:
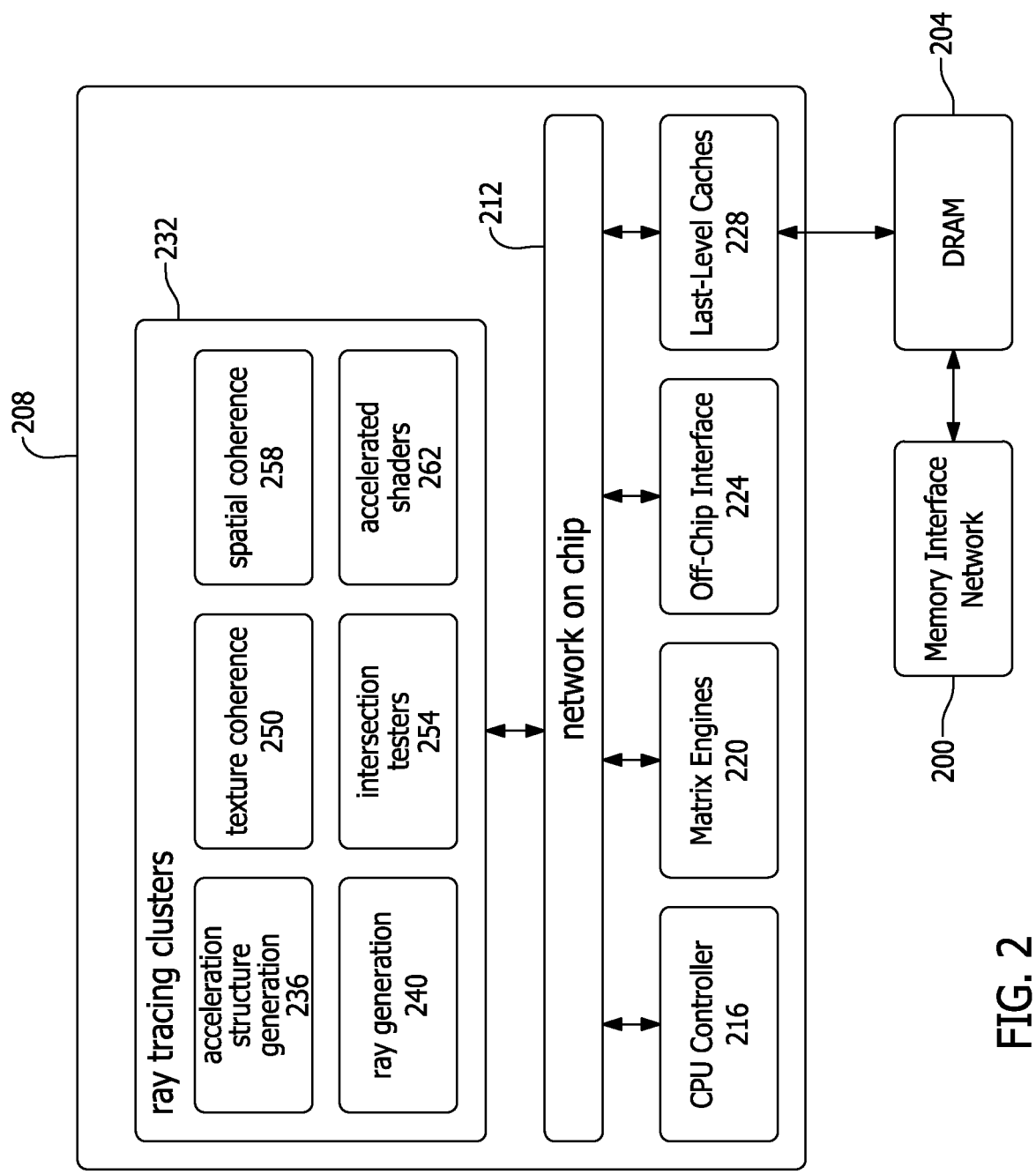
FIG. 2 illustrates an example of a hardware based ray tracing system.

FIG. 2 illustrates an example of a hardware-based ray tracing system. This is but one possible embodiment and it is contemplated that other embodiments are possible without departing from scope of the claims. The embodiment of FIG. 1 locates all the elements within an integrated circuit to optimize speed and efficiency, while reducing power consumption and heat generation. It is contemplated the one or more elements may be located off chip, such as on another die co-located in the same package, or a die located in separate packages. The system is primarily configured in hardware with some software controlling parameter settings and data flow, which provide numerous advantages over the prior art.

Referring to FIG. 2, a ray tracing system 208 is in communication with memory 204, such as DRAM, or any other type of memory, which associates memory controller and input/output systems. A memory interface or network 200 connects to the memory 204 to load data into the memory and retrieve processed data from the memory.

The ray tracing system 208 includes the hardware which performs ray tracing operation on the data loaded into the memory 204. Included in the ray tracing system 208 is memory caches 228, such as a last-level cache system configured to store recently used data, or data to be used in the future, by the ray tracing system. The cache memory 228 may comprise any type memory, although a fast memory speed is preferred. Cache systems and operations are known by one of ordinary skill in the art and as such is not described herein.

The memory cache 228 connects to the systems internal network 212. The network 212 may comprise any type network or bus configuration including but not limited to PCI type bus. The on-chip network schedules and transmits data to the various elements of the ray tracing system 208. Also connecting the network 212 is an off-chip interface 224, matrix engines, and a CPU (controller) 216.

The off-chip interface 224 may be provided in place of or in addition to the memory interface network 20. The off-chip interface is configured to connect and interface to one or more data sources, networks, or other devices to achieve data input and/or output. Data input/output is known in the art and as such is not described in detail herein.

The matrix engine 220 performs de-noising of the image generated at the end of the ray tracing processing. De-noising of an image is generally known in the art and as such not described in detail herein. The CPU/controller 216 may be any type processor, ASIC, controller, control logic, or other device capable of overseeing operation and scheduling of the ray tracing cluster and other elements of the ray tracing system optionally including data input and output. The CPU and/or controller 216 may be configured to execute machine executable instructions stored in memory associated with the CPU or controller, or stored in DRAM 204.

Also connected to the network 212 is the ray tracing clusters 232. The ray tracing clusters 232 include custom tailored hardware configured to perform the ray tracing calculations as described below. In this embodiment the ray tracing clusters include numerous different modules or engines configured to perform specific high speed processing operation which significantly reduce the frame processing time as compared to prior art software based solutions. Although shown with these specific engines, it is contemplated that other engines may be provided, or some processing may occur external to the clusters 232. In other embodiments, the individual engines may be separated into two or more separate engines, or individual engines may be combined into a single or reduced number of engines.

To aid in understanding, the terms used herein are defined as follows:
  Primitive: A geometric shape for which an intersection test has been written.
  Object: A distinct member of an N-dimensional scene composed of primitives.
  Intersection: The point, line, or region of three-dimensional space at which rays and/or primitives collide.
  Bounding volume: For a set of objects, a closed volume that completely contains the union of the objects in the set.
  Box: A rectangular prism.
  Acceleration structure: A data structure that is composed of nodes.
  Node: A principal unit containing object or primitive information within a data structure.
  Ray: a pair of 3D coordinates encoding a starting point/origin and a destination/direction. This set of information describes a vector in 3D space.
  Extents: a set of planes in 3d space that together bound a volume through the intersection of the planes.

Ray Generation Engine

At the heart of the ray tracing clusters 232 is the ray generation engine 240, which comprises primarily hardware configured to perform ray generation calculations. In one embodiment, the ray generation engine may comprise multipliers, adders, and combinational logic that outputs ray values according to its input configuration. A ray is represented by data that indicates or defines the ray's direction, such as by a starting point and ending point. Inputs that define the rays may be image size, image width, number of samples, sampling algorithm, etc. The ray engine may also or alternatively, be composed of a pre-processing unit and/or multiple processing units. These processing units can be scaled up or down depending on the target performance or application.

The ray generation engine 240 generates sorted, batched primary rays using one of a variety of methods (selectable by the user or controlling software). If the rays from the ray generation engine or are sorted/batched, then that process may occur after generation. The ray generation engine 240 may be configured to perform one or more of the following ray tracing generation methods: uniform sampling, jittered sampling, adaptive sampling, checkpointed sampling, and/or Poisson disk sampling. These are example and the ray generation techniques should not be considered as being limited to these methods.

The disclosed ray generation engine has numerous benefits over the prior art. Prior art systems and methods rely on software programs to generate unordered rays into a cache/memory subsystem. The disclosed method differs as ordered rays are generated using fixed-function hardware logic embodied in the ray generation engine 240. Rays are represented within the system mathematically as a data, such as for example two vector points that define direction of the ray (starting point and ending point) or any other way of defining a vector direction. If the ray hits or intersects a light source, the ray will create an intense reflection and be colored white or whatever color the light is defined as. If striking a non-illuminated object, reflections may be created based on the angle of indigence and reflectivity of the surface, defined by texture data. Only primary rays are generated from a user point of view, while reflected ray's origination point is the contactor or hit point of the incoming ray (which may be a primary ray or a reflected ray. Rays may reflect several times within a scene. The output of the ray generation engine feeds directly to primitive intersection engines 254 instead of the slower prior art method of storing generated ray data in a memory. In other embodiments, the generated primary rays could be stored in memory. In one embodiment, if the intersection engines are unavailable or full, and thus cannot accept additional generated rays, then the ray generation engine pauses operation, resulting in significantly lower memory consumption and bandwidth usage.

In one embodiment, input parameters are provided to the ray generation engine 240 to control the nature of the generated rays. The parameters may be provided by a user such as over a user interface. The ray input parameters may include but are not limited to the following to generate primary rays: screen height and width (or other parameters defining screen size, samples per pixel, and sampling method. In addition, other parameters may be provided to the ray generation engine depending on the type of sampling being used. For example, jitter sampling parameters may include subpixel resolution and variance. Adaptive sampling parameters may include pixel/image metric(s)/feature fusion, windowing height, width and step size, and stopping criteria/threshold. Checkpointed sampling parameters may include image buffer/accumulated ray contributions. Poisson disk sampling may include minimum distance between neighboring pixels. In one exemplary embodiment, the resulting ray may contain but is not limited to the following data: Origin, Direction, Sample ID, Pixel ID, Barycentric Coordinates, Intersection Point, and Normal of Intersection Point.

The generated primary rays from the ray generation engine 240 are passed to intersection engine(s) 254 for processing. As stated above, if the intersection engines 254 are busy and cannot ingest new rays, the ray generation engine 240 is paused, which is contrary to the prior art method of continuing to generate rays and storing the rays in memory until the software based processing capability was available. The prior art method was slower and more complex than the method described herein.

Acceleration Structure Generation Engine

Also part of the ray tracing clusters 232 is an acceleration structure generation engine 236. The acceleration structure generation engine 236 is configured for receiving geometry from the cache/memory subsystem and building an acceleration structure. An acceleration structure is a data structure, that is explicitly or is implicitly tree-based, that significantly reduces the number of performed ray-primitive intersection tests, as child nodes testing can be avoided if the parent is not intersected.

The acceleration structure generation engine 236 may be a BVH type engine or any other type of engine and may be configured to create or form a tree structure, a grid structure, or any other type of acceleration structure. In one embodiment, the acceleration structure generation engine 236 comprises multipliers, comparators and control logic and may also include control logic to control element interaction and data flow. For the acceleration structure generation engine 236, also referred to herein as logic, the input data is the list of primitives that make up objects in the scene. For the acceleration structure generation engine the output data is the bounding volumes that bounds individual objects and bounding volumes that bounds groups of objects, as well as the information that groups these bounding volumes and arranges them in a tree or hierarchical structure. The acceleration structure generation engine 232 reads the input from input buffers, processes these inputs to generate the output and stores output in the output buffers.

Figure 5B:
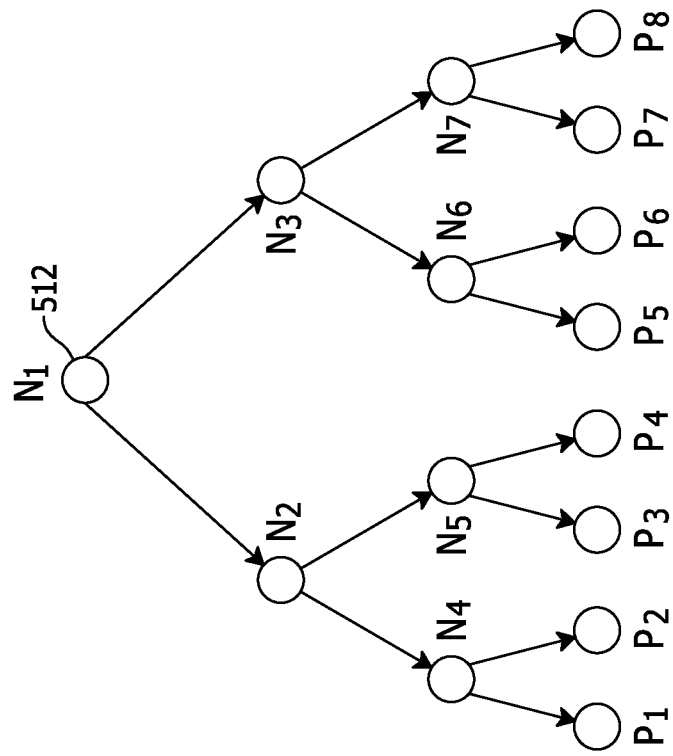
FIG. 5A and FIG. 5B illustrate an exemplary scene geometry with nodes showing primitives contained therein and a possible resulting acceleration structure.
Figure 5A:
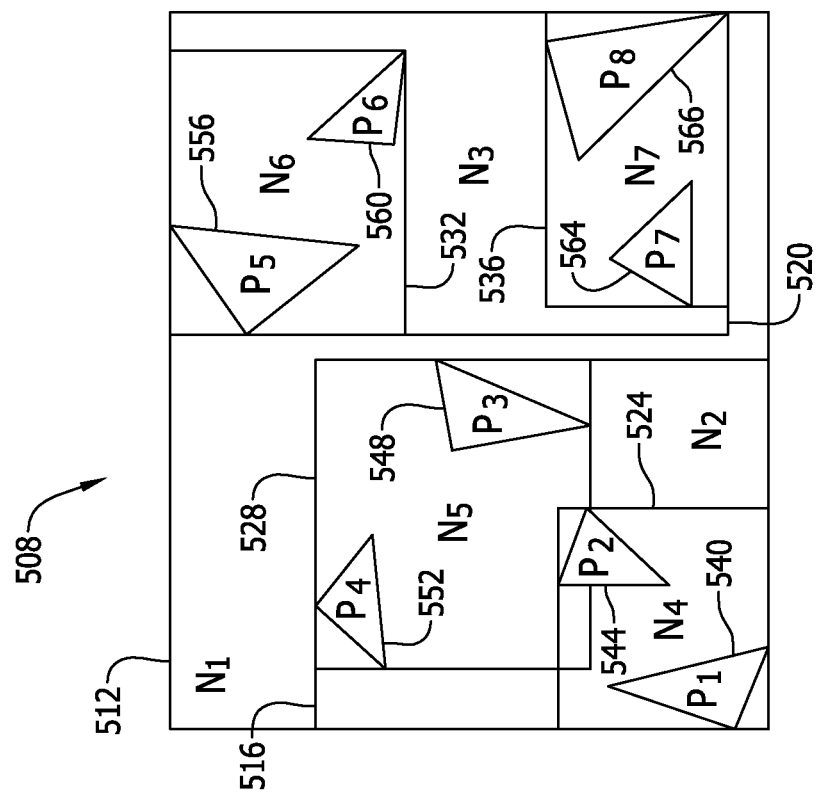

To aid in understanding of an exemplary acceleration structure, FIGS. 5A and 5B illustrate an exemplary scene geometry with nodes showing primitives contained therein and a possible resulting acceleration structure. In this embodiment, an exemplary a tree structure is shown that is generated from the geometry. The embodiment of FIG. 5A is generally known, and as such is not described in detail. The innovation has improvements over the tree structures as are disclosed herein. Referring to FIG. 5A, a geometry is shown that represents a scene in frame. The geometry (including primitives) is processed to designate aspects of the geometry as numerous nodes and to associate the nodes (or containers) with primitives. The designations are a result of the acceleration structure generation. As shown, node 1 is the root node that encompasses the entire scene. Within the root node 512 are sub-nodes N2-N7 516, 520, 524, 528, 532, 536. Within each node are primitives P1-P8 540-566. For example, node 6 N6 contains primitives P5, 556 and P6 560. Similarly, node 7 N7 536 includes primitives P7 564 and P8 566.

FIG. 5B illustrates a resulting acceleration structure developed from the scene 508 of FIG. 5A. As shown, the root node N1 512 is at base of the tree, and it branches outward toward node 2 N2 and node 3 N3. Further branching occurs such that node 2 N2 branches into node 4 N4 and node 5 N5. Eventually the branching ends with primitives P1-P8. For example, node 6 N6 branches into primitive 5 P5 and primitive 6 P6.

It is completed that other geometries are possible. This pruning-like behavior of a tree structure results in a much smaller subset of primitives intersected, reducing the number of primitive tests performed. The acceleration structure and its hardware based implementation achieves processing speed gains.

The acceleration structure generation engine is a novel improvement over the prior art. Prior art methods rely on software programs to generate a two-level (bottom- and top-level) acceleration structure which is loaded into a cache/memory subsystem. Alternative methods also are limited by the types of primitives supported. The disclosed method and acceleration structure is an octree supporting a variety of primitive types and is generated using fixed-function hardware logic. In other embodiments, acceleration structures other than an octree are contemplated. For example, the tree may be comprised of 16 tree paths. Thus, a greater number or few number of tree paths may be generated to accelerate intersection analysis. In addition, instead of passing the resulting monolithic acceleration structure into a cache/memory subsystem, it is broken down into eight parts and passed directly to intersection engines. This results in faster operation as compared to the prior art.

In one exemplary embodiment, an octree is developed by the acceleration structure engine with a depth, which may be a number of depth levels, and is constructed by continuously subdividing 3D space by a numeric dividing value when necessary. In one embodiment, the depth of the octree created by the acceleration structure generation engine 236 is 16 levels, which is divided by 8 values when necessary. This provides a structure which clusters objects hierarchically. This structure provides the benefit of reducing the exhaustive number of intersection possibilities in the ray-primitive space.

In one or more embodiments, the octree created by the acceleration structure generation engine 236 can support a variety of primitive types, including, but not limited to: triangles, quadrilaterals, voxels, parametric surfaces, spheres, and/or polygons. In addition, the primitives above can be bounded by tight-fitting volumes. The volumes may include but are not limited to extents, cylinders, bounding boxes, and spheres. Extents are a set of planes in 3D space that together bound a volume through the intersection of planes. The extents produce a tighter-fitting bounding volume than a bounding box, at the expense of a more complex intersection test. This is discussed in greater detail in the paper titled *Ray Tracing Complex Scenes* written by Kay and Kajiya (1986). Other types of acceleration structures include, but are not limited to: KD tree, linear bounding volume hierarchy, binary tree, uniform grid, hierarchical uniform grid (HUG) (a hybrid between BVH and uniform grid), binary space partitioning, and octree.

In the example embodiment described herein, the output of the acceleration structure generation engine (for example but not limited to, a BVH generation engine) is a node-based data structure, wherein the initial node is the "root" of the hierarchy. In one exemplary configuration, the node-based data structure consists of the bounding volume of the current node, a set of memory pointers to the current node's children (if any), and a set of bounding volumes of the contained primitives (if any). In other embodiments, the data structure may be a grid structure instead of node based.

It is also disclosed that the acceleration structure 236 can be distributed with each segment containing a pointer to its parent, allowing for the system to store parts of the tree in different locations. As a result, rays can be sent to any part of the tree which increases processing speed. A table or other structure may store the location of each part of the tree, and rays can hold information describing the results of traversal for that part of the tree. In other embodiments, different configuration details are contemplated.

Spatial Coherence Engine

Also part of the embodiment shown in FIG. 2 is the spatial coherence engine 258 which organizes rays to exploit the unique hardware features of the ray tracing system (configured herein as a system on a chip (SOC)), reducing execution stall time, cache/memory usage, and cache/memory bandwidth. The spatial coherence engine 258 is configured in hardware and in one embodiment comprises a series of iterations of parallel sorting of inputs. Each iteration uses variables as indices to the entries to be sorted. The first iteration uses a variable K that is initially set to 2 and then doubles per iteration. The K value is passed on to the immediate Process J for further processing. The iteration repeats until the K variable reaches the total number of entries to be sorted. This process is discussed below in FIGS. 7A-7D. In the embodiment shown in FIG. 2, the rays are batched together to create bundles, which are optimized in size for the layout of the physical engines on a chip.

The parameters by which rays are organized, prioritized, and batched by the spatial coherence engine 258 may change depending on the scene geometry, user-provided parameters, and the configuration and the status of other workloads on the ray tracing system. In an exemplary embodiment, rays can be sorted by origin, direction, termination point, and/or length of ray. Additionally, the batch size (the number of rays inside a batch) can be configured by control logic or a user input which selects or controls the processing hardware. In other embodiments, the spatial coherence engine 258 may be configured to sort based on other parameters or configured differently.

The sorting of rays may be configured to arrange the rays based on the alignment or direction of the rays, or another common feature among rays. It can be beneficial to have the rays facing the same direction, which groups the rays into groups of rays that are likely to intersect the same geometry. This in turn increases the likelihood of locality of the data in the cache. Cache reads are fasters when reading a consecutive or contiguous block of data. It is also contemplated that the rays may be sorted into space (area) geometry which also increases efficiency of memory read operations. Batching the rays or batch processing of the rays comprises processing the rays in groups and not processing rays one by one. Batching may depend on the physical layout and architecture of the ray tracing system.

As discussed above, the ray parameters define the ray direction, but could also be origin based on performance factors, or a combination of the two. In addition, the ray parameters (which may be used during sorting and batching) may also include geometry texture (which may include reflectivity) to associate rays which intersect a particular type of texture for processing as a batched group. The degrees of freedom are defined by the number of parameters used to sort a ray described in herein, such as origin, direction, termination point, and/or length of ray. The number of ray parameters defines the dimensions in the corresponding ray space. It is also contemplated that the ray space can be flattened into one dimension along a space preserving curve if and where the order of sorting matters.

The spatial coherence engine 258 is designed to ingest any number of unsorted, unbatched rays, and output sorted, batched rays to the cache/memory subsystem. The spatial coherence engine may handle this ingestion in small batches, all at once at some interval, or until its memory subsystem is full. It is contemplated that in this embodiment the rays from the ray generation engine 240 are already sorted at generation however, in other embodiment, the output of the ray generation engine 250 may not be sorted. In addition, because in this embodiment the ray generation engine 240 outputs ordered/sorted rays, the spatial coherence engine 258 sorts and orders original rays (primary rays) with reflected (secondary rays) for further processing in an efficient manner.

The spatial coherence engine 258 is an improvement over the prior art system, which relies on software programs to order and group rays. In addition, prior art systems do not support ordering and/or grouping primary and secondary rays. The spatial coherence engine 258 disclosed herein also differs from the prior art as rays are ordered using fixed-function hardware logic using, in the example embodiment of FIG. 2, using the bitonic parallel merge sort algorithm. In other embodiments, other sorting algorithms may be configured in hardware.

Intersection Engines

The computationally intensive part of the ray tracing process is intersecting rays with primitives. The primitives are part of the geometry stored in the DRAM. This aspect of the ray tracing system is performed by intersection engines 254. In one embodiment, the intersections engines 254 may comprise boundary intersection engines and primitive intersection engines. This is done to find the exact point the ray intersects the primitive, and to calculate information used to later shade the pixel from which the intersecting ray originated. In one embodiment, the primitive intersection engine may comprise multipliers, adders, and combinational logic. These elements are configured to check the intersection between the generated rays and primitives of an input scene or object. Similar to the ray engine, the primitive intersection engine 254 may also or alternatively include a pre-processing unit and multiple processing units which can also be scaled up or down.

The intersection engine performs the acceleration structure traversal by comparing the path of the ray, as defined by the ray vector, which defines its direction, into the scene and determining if the ray intersects the geometry, such as bounding volumes, and if so, which primitives within the bounding volume are intersected.

The disclosed intersection engines 254 are novel over the prior art for at least the reason that the prior art is limited in the types of primitive intersection engines. Prior art methods only support bounding boxes, triangles, and/or Bezier curves. The disclosed methods and systems include additional support for extents, quadrilaterals, cylinders, voxels, and spheres type primitives. In addition, the disclosed intersection engines include novel support for traversing a distributed octree, where only a part of the tree is accessible which is not possible in the prior art.

As discussed above, when the acceleration structure contains more than one type of primitive, different or additional intersection engines 254 are needed such that an intersection engine is configured to operate with an associated or designated type of primitive. Stated another way, in one embodiment, one engine is not designed to intersect more than one primitive type, instead being optimized for processing speed with a particular type of primitive. The intersection engines 254 types may include one or more, but are not limited to, the following: triangle tester, extents tester, quadrilateral tester, cylinder tester, voxel tester, box tester, and sphere tester. These shapes are known geometric shapes. An extent is a shape defined by six or more planes and can be used to define an irregular shape. A voxel can be considered a cube or other shape that a ray can go inside and can bounce (reflect) around inside. Examples of voxels include clouds, smoke, mist, fog, or non-solid geometry.

In one example embodiment, the process by which intersections test are performed by the intersection engine 254 may be described as a two part process. Initially, the rays are processed by the intersection engine to traverse the rays through or into the acceleration structure and determine intersects of the rays with the bounding volume(s) (extent, cylinder, box, sphere). During this operation, if the ray hits or intersect a primitive (triangle, quadrilateral, voxel, sphere) the system records closest point of intersection with the primitive.

As primitive intersection is more computationally, more intensive than bounding volume intersection, the bounding volume intersections are performed first. If a ray does not intersect the bounding volume, it is discarded, and the lack of intersection may or may not be recorded. However, if the ray intersects the primitive within a bounding volume, the coordinates of the intersection point are stored in the ray payload, as well as the normal of the intersection point.

In the situation that a ray is passed to a part of the tree and the intersection engine 254 determines that the ray misses all geometry (as adapted by the acceleration structure generation engine 236), the control logic can pass the ray to a different part of the tree that has not been traversed, until the entire tree is traversed either without any hits or if a hit occurs, the hit and associated details are recorded. In the case of an eight (or any other number) path tree, the ray may traverse all 8 paths without a hit (intersection). In one embodiment, once a ray intersects a primitive, the process repeats for all subtrees/treelets/bounding volumes and their contained primitives are examined, in order to find the nearest intersection. In another embodiment, once a ray intersects a primitive, no additional processing need occur.

The intersection engines 254 are designed to ingest a primitive and a ray. The resulting ray may vary depending on whether an intersection was recorded and is placed in the cache/memory hierarchy if the texture coherence engine is full.

Texture Coherence Engine

Also included in the ray tracing cluster 232 is the texture coherence engine 250, which is responsible for sorting intersection results by the texture mapped to the primitive as well as material type, material, and other material properties defined by the texture. A texture defines a surface and may include parameters such as, but not limited to, the reflectivity, color, and surface matter. A texture is assigned to one or more elements of the geometry, such as but not limited to primitives. Primitives which make up an object and which are assigned to a single texture, would share the same texture data adding an additional level of coherence. As a result, sorting the intersection results to utilize that common coherence improves performance and reduces memory footprint as compared to prior art systems. The texture coherence engine 250 may be formed from the similar hardware as the spatial coherence engine discussed herein, where a series of iterations of parallel sorting of inputs. Each iteration uses variables as indices to the entries to be sorted. The first iteration uses a variable K that is initially set to 2 and then doubles per iteration. The K value is passed on to the immediate Process J for further processing. The iteration repeats until the K variable reaches the total number of entries to be sorted. This is discussed below in FIGS. 7A-7D.

In one embodiment, the texture coherence engine 250 relies on a table containing mapping data of primitives and textures (using texture ID's). This information can be stored in the cache/memory subsystem, or inside the texture coherence engine 250 itself. The texture coherence engine 250 is designed to receive (ingest) any number of unsorted (or sorted), unbatched (or batched) intersection results along with texture ID's, and output sorted, batched intersection results to the cache/memory subsystem. In one embodiment, the texture coherence engine 250 is responsible for performing light calculations, shader programs run on shader cores and convert intersection results to shaded geometry, which are outputted to memory as a final image containing pixels.

Accelerated Shader Cores

To perform shading functions, one or more accelerated shader cores 262 are provided. A typical shader core comprises integer and floating point multiply and accumulate (FMA) units and arithmetic logic units (ALU), with some limitations around supported operations and inputs/outputs. Prior art shader software programs, utilize unoptimized processors executing software code and there are many examples of shaders that exceed 100 lines and are considered highly complex, and as a result, slow. In one embodiment, the accelerated shader cores 262 disclosed herein comprise integer and floating point FMA ALU's, with limitations on supported operations dictated by a standard ISA (for example, RISC-V). The accelerated components are designed to offload complex operations from the ALU, where they can be performed faster and more efficiently.

The accelerated shader cores 262 is novel over the prior art systems. Prior art methods and apparatus utilize a software-programmable logic unit designed to accept an instruction and execute it to manipulate pixel and vertex data. The method and apparatus disclosed herein adds fixed-function hardware logic (to the existing software-programmable logic unit) to perform instructions used for light ray calculations, a key part of the ray tracing process.

As disclosed herein, are accelerated shader cores 262 configured to ingest rays, textures, and additional primitive data and output the pixel color to the cache/memory subsystem. Rays have intersection point and intersection point normal information as well as pixel IDs to determine color for each individual pixel. Pixel intensity may also be calculated by the shader cores 262, which can be adjusted based on screen brightness and contrast levels.

Processing Acceleration

The types of functions that can be accelerated with the system of FIG. 2 vary. In the embodiment shown in FIG. 2, the accelerated aspects typically focus on ray-tracing. The subset of light properties in ray tracing that are accelerated are functions and operations that approximate the light transport equation/rendering equation for an entire scene. The light transport equation/rendering equation is:

$$L_s(x, \hat{w}) = L_e(x, \hat{w}) + \int_{\Omega} f_r(x, \hat{w}', \hat{w}) L_j(x, \hat{w}') |\cos(\theta_i)| d\hat{w}'$$

Where a combination of shaders will determine the surface radiance $L_s$ given a point x in the direction of $\hat{w}$ by adding the emitted radiance together with the incoming radiance from one ray and the bidirectional reflectance distribution function (BRDF). The following list of operations and functions below are examples of shader workloads/names of shader accelerators. Other or additional operations and functions are contemplated. One type of operation or function is global/indirect illumination. Global/indirect illumination comprises light that is reflected within the scene to add more realism to the lighting effects within the scene. The type of global/indirect illumination include but are not limited to reflections, shadows, refractions, caustics, and color bleeding. Reflections are generally understood and may comprise diffuse and specular reflections. Examples, include BxDFs (BRDFs, BSSRDFs, etc.) Where $f_r$ is the BRDF given by:

$$f_r(x, \hat{w}', \hat{w}) = \frac{dL_r(x, \hat{w})}{L_f(x, \hat{w}' \cos\theta d\hat{w}')}$$

Sampling/ray guiding is defined as the estimation of the rendering equation given by the Monte Carlo integration:

$$g(x) = \frac{f(x)}{p(x)}$$

Where g(x) forms the estimator by randomly choosing x from some domain D with the probability density function p(x).

Shadows are generally understood while caustics comprises of any contributions of light that travel from the light source to an object that is specular (reflective or refractive), to a diffuse object and then to the camera. Luminance that comprises indirect illumination to evaluate color bleeding and other object to object interactions are defined by the integral over $\Omega$. Other types of operation and functions include direct/local illumination and volumetric effects, such as but not limited to smoke, clouds, fog, and water.

As a further benefit of the embodiments disclosed herein, the memory footprint can be reduced in an architecture where shader cores share texture data and aligning rays to those shader cores eliminates the need to duplicate processing (and consume additional memory bandwidth and cache space) by fetching the same texture to another shader core. Instead, the ray can be queued in the cache/memory subsystem and retrieved up by another shader core, which processes data input/outflow and processing time.

Figure 3:
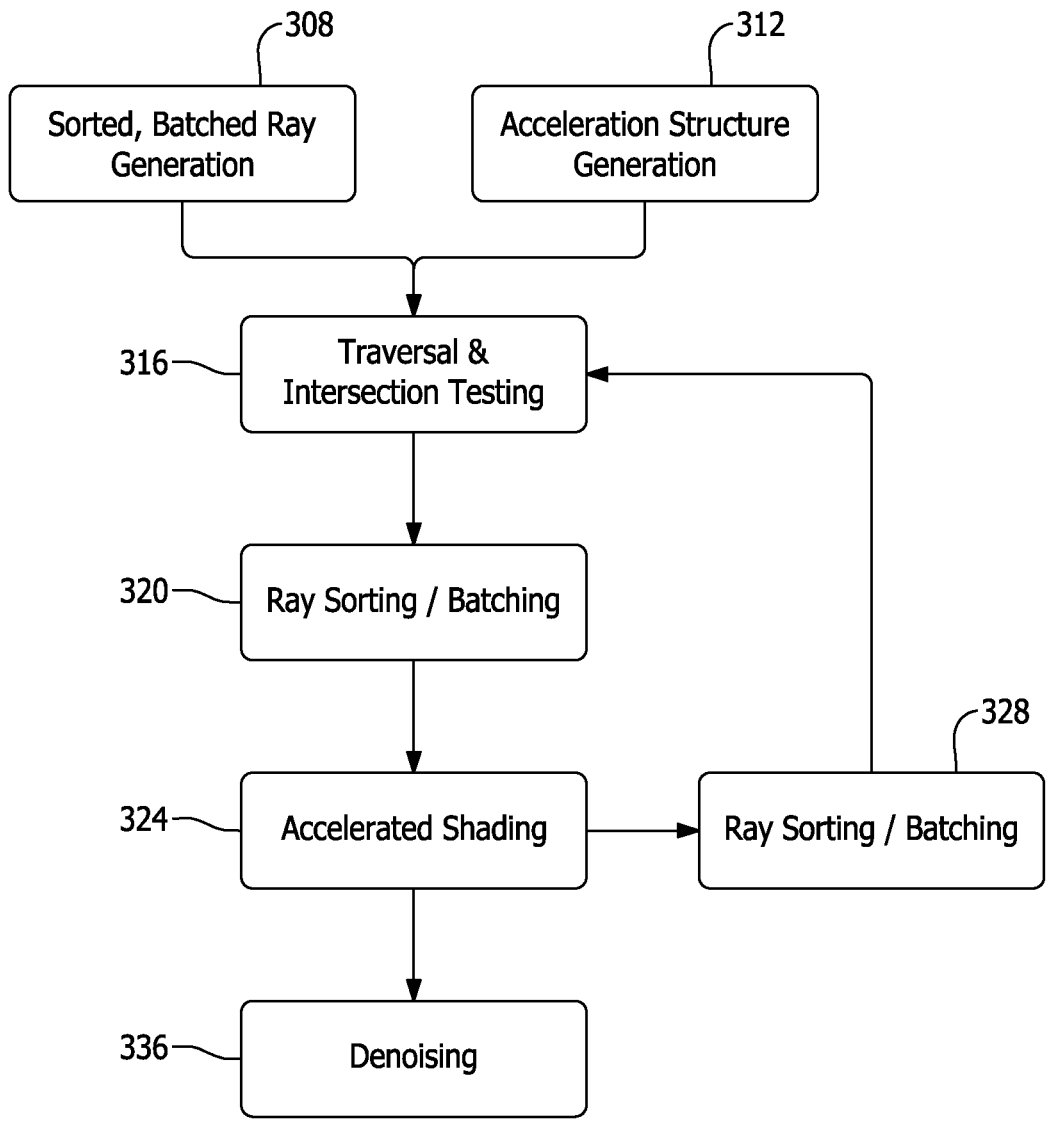
FIG. 3 illustrates a flow diagram of an example method of operation.

FIG. 3 illustrates a flow diagram of an example method of operation. This is but one possible method of operation and as such, other methods are contemplated that do not depart from the scope of the claims. Prior to execution of the shown operations, the parameters that control ray generation are received and entered into the ray generation system. Similarly, the scene geometry is loaded into memory, such as DRAM or any other local or networked memory. The scene geometry may be provided by a third party. At a step 308, the ray parameters are used by the ray generation engine to generate rays. In this embodiment, the rays are sorted and/or batched at the time of generation. However, in other embodiments that process may be passed to the spatial coherence engine after ray generation.

In addition, at a step 312, the accelerated structure generation engine generates an acceleration structure using the geometry data. The acceleration structure generation analyzes and categorizes the geometry into a structure, such as a multiple branch tree structure, to facilitate a more efficient and thus faster analysis of ray intersection with geometry elements. The acceleration structure is discussed above in more detail.

At a step 316 the intersection engines perform traversal processing of the generated rays and the geometry to test for intersections between the ray, along its path, and the geometry. The intersection testing operation also receives an input from a spatial coherence engine to provide additional batched and sorted rays such as secondary rays resulting from reflection or other ray sources.

After step 316, the intersection data from the intersection engine undergoes ray sorting and batching at step 320. The processes of ray sorting and batching comprises analyzing and arranging the rays by direction, texture intersection or some other factor. After ray sorting and batching, the operation advances to step 324 where accelerated shading occurs by the one or more accelerated shader cores. In this step the shader cores ingest rays, textures (from memory or as part of the loaded geometry) and additional primitive data and output the pixel color the memory.

After the shading at step 324 the method of operation advances to step 336 and step 328. At step 328 additional ray sorting and batching occurs. By sorting and matching the reflected rays, the acceleration structure may be navigated more quickly as described herein. At a step 336, de-noising occurs, such as by the matrix engine to remove noise that present in the frames after shading processing.

This process repeats over the entire frame, and then processes the next frame. Although shown in the presented order of operations, it is contemplated that these steps may occur in a different order or may occur concurrently. For example, while one portion of the frame is undergoing processing, concurrent processing may occur on a separate part of the frame. In addition, other steps may occur in a different order than that shown. The process may be thought of as a pipeline such that to reduce processing time per frame, data is continually being processed through the pipeline.

Figure 4:
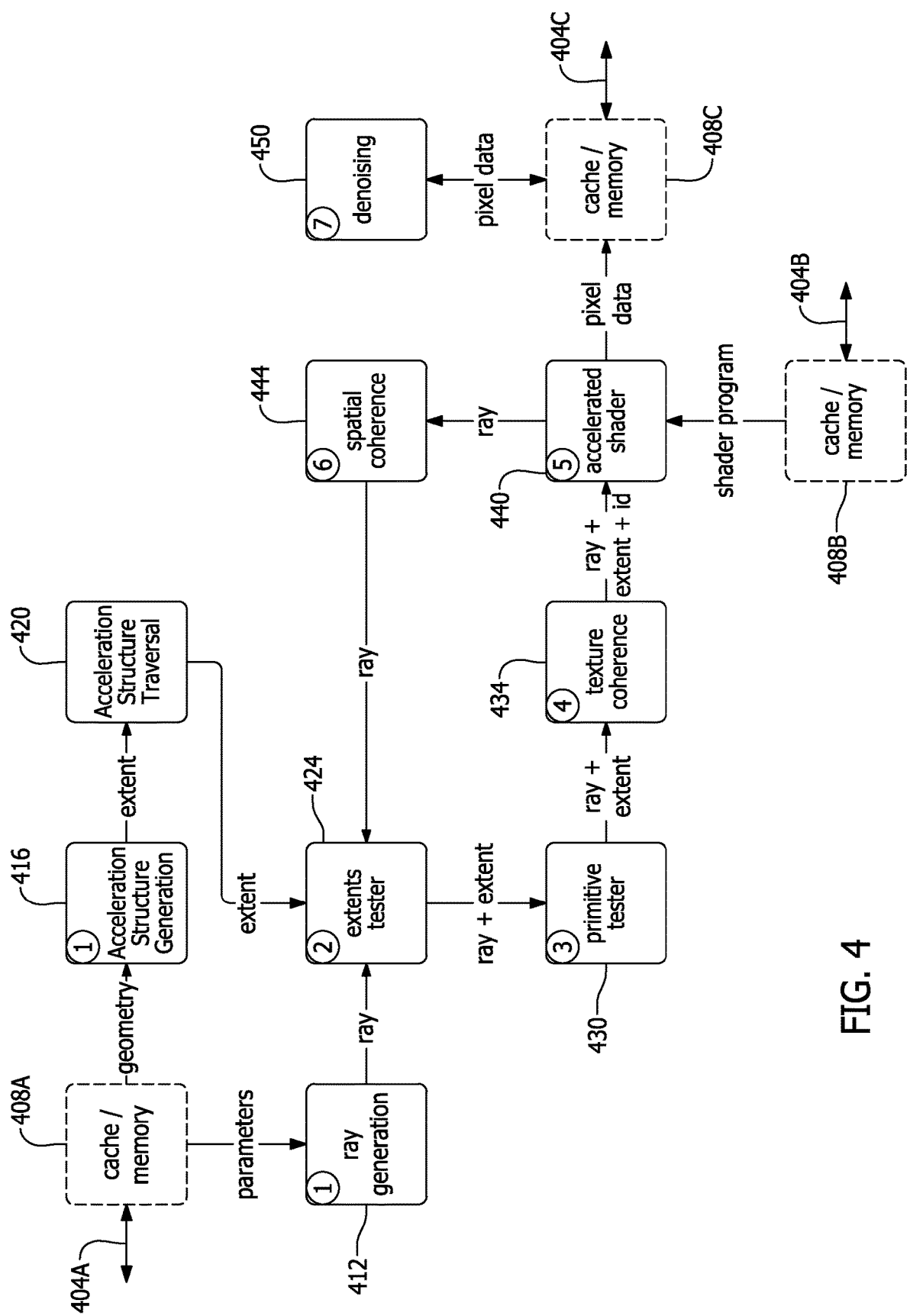
FIG. 4 illustrates an example embodiment of a processing pipeline for one example embodiment of the innovation disclosed herein.

FIG. 4 illustrates an example embodiment of a processing pipeline for one example embodiment of the innovation disclosed herein. This is but one possible processing pipeline and it is contemplated that other processing pipelines are possible without departing from the scope of the claims. In this example processing pipeline, the cache memory 408A, 408B, 408C is provided and loaded with data. The cache memory 404 may be distributed to reduce read/write access times or configured as a single memory. Input/Output paths 404A, 404B, 404C are provided to load data into the memory 404 and retrieve processed data from the memory. In this embodiment, the cache memory 408A is loaded with ray tracing parameters and geometry.

The ray tracing parameters are discussed above and are provided to or read by the ray generation engine 412. The ray generation engine 412 generates the rays as discussed above. Concurrently, the geometry data for the frame scene is provided to or accessed by the acceleration structure generation engine 416 for processing to generate an acceleration structure as discuss above. The resulting acceleration structure, referred to herein as extents because it defines the extents of each scene geometry, of the acceleration structure generation engine 416 and the rays from the ray generation engine 412 are provided to a traversal engine for acceleration structure traversal 420. Traversing the acceleration structure comprises analyzing and processing the acceleration structure to determine bounding volume intersections with rays. A bounding volume is a set of objects in a closed volume that completely contains the union of the objects in the set. Bounding volumes are used to improve the efficiency of geometrical operations by using simple volumes to contain more complex objects. As primitive intersection is more computationally expensive than bounding volume intersection, the bounding volume intersections are performed first. If a ray does not intersect the bounding volume, it is discarded, or assigned to a different tree branch for further processing. This reduces processing operations and processing time.

After processing for bounding volume intersections, the process advances to step 424 for extents testing 424. The extents tester processes the rays and extents by comparing the ray paths to primitives within the acceleration structure. If a ray encounters a primitive, then the primitive that was intersected and recorded with the primitive type primitives (triangle, quadrilateral, voxel, sphere) and the closest point of intersection is also recorded. When a ray intersects the primitive, the coordinates of the intersection point are stored in the ray payload, as well as the normal of the intersection point. In the situation that a ray is passed to a part of the tree and misses all geometry, the control logic can pass the ray to a different part of the tree that has not been traversed, until the entire tree is traversed, either without a hit, or if a hit occurs, it is recorded. Primitive intersection engines are designed to ingest a primitive and a ray. The resulting ray may vary depending on whether an intersection was recorded and is placed in the cache/memory hierarchy if the texture coherence engine is full.

The extents tester output a rays and an extent which is provided to a primitive tester 430. The primitive tester 430 processes the rays and extents by checking each contained primitive in the extents bounding volume.

The output of the primitive tester 430 is the ray and extents which is provided to the texture coherence engine 434. The texture coherence engine 434 processes the rays and extents to sort the rays based on the texture assigned to the primitive that the ray intersected. The output of the texture coherence engine 434 is the rays with extent information and ID information to the accelerated shader 440. The accelerated shader 440 performs shading as described above on the ray, extent, and ID data. To perform the shading, the shader 440 receives a shader program from the memory 408B. The term memory should be understood to mean cache and/or memory. The output of the accelerated shader comprises rays (such as reflected rays) which are provided to the spatial coherence engine 444, and pixel data is provided to the memory 408C as the result of the ray tracing process. The pixel data is collected into the memory 408C and output over the input/output port of the memory. Denoising may occur as needed by a de-noising engine 450 and the pixel data or frame data may be stored back in the memory 408C The reflected rays are provided to the spatial coherence engine 444 for sorting and batching of the rays for the purposes discussed above. The sorted and batched rays from the spatial coherence engine are provided to the extents tester 424 for further processing.

Figure 6:
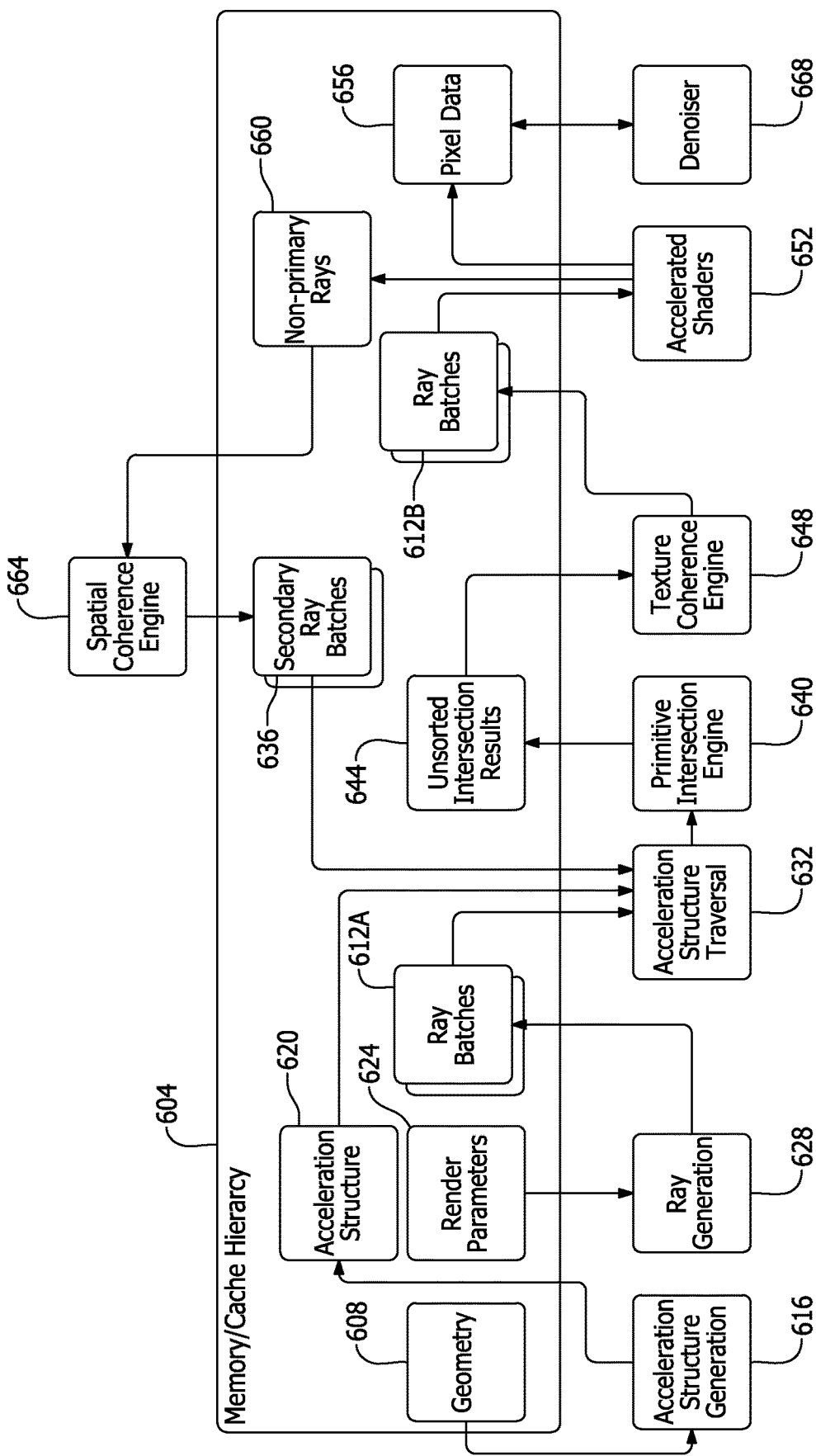
FIG. 6 illustrates an exemplary flow diagram for an example method and system for extracting ray coherence.

FIG. 6 illustrates an exemplary flow diagram for an example method and system for extracting ray coherence. Broadly, an embodiment of the present invention provides an apparatus and method for extracting ray coherence in a ray tracing architecture. Organizing rays to exploit the unique hardware features of the SoC reduces execution stall time, cache/memory usage, cache/memory bandwidth, and reduces overall execution time. Furthermore, batching and sorting rays increases the efficiency of the process, resulting in less geometry processed multiple times, and removes the need to wait for data to be loaded from disk or memory. Processing overheads due to the inherent limitations of general purpose CPUs and GPUs may be alleviated by hardware accelerating the key step of ray batching or sorting. Previous methods do not hardware accelerate ray batching or sorting, resulting in limited performance on the second and subsequent ray (reflection) bounce in all types of scenes and significantly limited performance in complex scenes with large datasets and high resolutions.

In accordance with one embodiment, a ray batching system performs or establishes spatial coherence using hardware to accelerate the computationally intensive task of sorting, prioritizing, and batching rays in a way that may be optimized for the system on a chip ray tracing and may be configured to run at multiple points in the ray tracing process. The parameters by which rays are sorted, prioritized, and batched may change depending on scene geometry, user-provided parameters, and the configuration and the status of other workloads on the system.

The present invention differs from and provides advantages over the prior art. Prior art implementations performed different types of ray sorting and do not perform batching or prioritizing. The most common software implementations are generalized for a wide variety of CPUs and GPUs and as a result, achieve poor performance. The present invention overcomes this drawback by hardware accelerating the process and also adding in batching and sorting as part of spatial coherence processing to increase performance significantly, as well as improving usability (as there is less work to be done by software developers and users) and enables more complex scenes without penalizing performance. Prior art hybrid software and hardware systems utilize general-purpose off the shelf components that have not been optimized specifically for ray tracing workloads and as a result experience limited performance, with an increased effect on more complex scenes.

In some embodiments, the ray batching engine of the present invention comprises a synthesizable engine that may be deployed in-hardware as a key part of the ray tracing process. It may also be deployed independently of the system described above. In accordance with the present invention, a system may be provided which includes or is configured to interface with at least one computer with a user interface. The computer may allow the user, via a user interface, to control parameters, monitor settings and progress, and other such management functions. The computer may include at least one processing unit coupled to a form of memory. The computer may include, but may not be limited to, a microprocessor, a server, a desktop, laptop, and smart device, such as, a tablet and smart phone. The computer may include a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

The ordered combination of various ad hoc and automated tasks in the presently disclosed platform achieves technological improvements through the specific processes described more in detail below. In addition, the unconventional and unique aspects of these specific automation processes represent a contrast to merely providing a well-known or routine environment for performing a manual or mental task. Referring to FIG. 6, an exemplary embodiment the present invention may provide a system or apparatus which may include one or more of the following elements or components and combinations thereof. Multiple of the structures of FIG. 6 may be running in parallel in a system, such as on a single PCB, in a single package, or on a single due.

The system may include a ray generation engine which is responsible for generating rays based on geometry and application-specified parameters. An acceleration structure generation engine is responsible for generating the bounding volume hierarchy given a pool of rays and geometry data. A ray batching engine, also referred to as a spatial coherence engine is responsible for batching, prioritizing, and sorting rays given an acceleration structure and geometry. A system control processor comprises a collection of CPU cores capable of performing management operations on the other subsystems, as well as running applications and workloads inside a loaded operating system, without requiring connectivity to an external host CPU. One embodiment may also include ray-box/triangle testers (primitive intersection test engine) which are a collection of small, highly optimized intersection testers. A ray feeder may also be provided to provide an intermediate engine that feeds rays into clusters of shader cores.

Also part of one example embodiment are shaders which are a collection of shader cores that shade pixels either based on geometry or ray intersection results and outputs an entire graphical image, or a portion thereof. It can also be used to perform calculations on floating point or integer data without outputting a graphical image, useful for general-purpose parallel processing workloads. As discussed above, a matrix multiplication engine is configured as a collection of small, highly optimized matrix multiplication units designed to accelerate matrix operations. To store data and provide for rapid read/write operations, a coherent cache memory may be provided as shown and configured as a collection of embedded SRAM cells that provide low-latency access to small amounts of data. Data not available in the cache is retrieved from off-chip memory, such as network accessible memory, to which this system is directly connected. The cache may be coherent and made available to every engine. DRAM or any other type of memory is provided as one or more DRAM dies (off-chip) connected, through the cache, to the system on chip and made available to one or more engine.

The component or elements may interrelate in the following manner. Rays may be generated based on render parameters 624 by a ray generation engine 628 based on the render parameters stored in memory 604. Typical parameters include target frame resolution, camera(s) location(s), and samples per pixel. A pool of rays may be generated and stored in memory 604 or generated as needed.

The acceleration structure generation engine 616 reads in the geometry 608 from memory 604 and generates an acceleration structure 620 and stores the result in memory. A ray batching engine 628 receives the rays from the ray generation engine 628 and, if not already sorted and batched, first sorts rays by origin, then time, then by direction. These sorted rays may then be sorted dynamically into batches, and these batches may be prioritized based on the type of rays contained inside them. The ray batching engine 628 pushes the batches to memory (such as DRAM) 604 and creates a small database containing a list of batches 612 and associated details, like the prioritization and number of rays. This database may be kept in cache. The batched rays could be processed directly after creation and not be stored in memory.

A system control processor has control over other workloads scheduled and running on the system on chip and partitions workload to maximize parallelism and utilization. If there are other identical ray tracing systems connected to the one described in this process, the system control processor may share the acceleration structure 620, batched rays 612, and the batch table with them so they may partition themselves to further accelerate the process.

After partitioning, the acceleration structure transversal engine 632 receives the batched rays 612 from memory 604 as well as the acceleration structure 620, and also secondary ray batches 636 generated from secondary ray reflections. The acceleration structure traversal engine test for ray intersection with bounding volumes in the hierarchy and thereafter the results are provided to the primitive intersection engine(s) 640 which test for ray intersections with primitives. The result of the acceleration structure transversal and primitive intersection tests are provided to memory and stored as unsorted intersection results 644.

The unsorted intersection results are then processed by a texture coherence engine 648, which is described above in greater detail. The results of texture coherence processing are stored in a second set of batched rays 612B. An accelerated shader 652 receives the second set of batched rays 612B and performs shading operations as discussed herein. The output of the accelerated shader engine 652 is provide as pixel data 656 and stored in the memory 604. The pixel data 656 is processed by a denoiser 668.

The accelerated shader 652 also provides an output comprising non-primary rays 660 which are stored in memory 604. A spatial coherence engine 664 reads the non-primary rays, which are typically reflected rays, for processing such as by sorting and batching, and fed back into the memory and stored as the secondary ray batches.

FIGS. 7A, 7B, 7C, and 7D illustrates exemplary flow diagram of example method of coherence engine processing. This is but one possible method coherence processing and other methods are contemplated that do not depart from the claims. These operational loops are nested loops as described herein. The coherency engine is based on the bitonic merge/sort parallel algorithm. The number of parallel inputs is 32 (configurable) and are processed per 1 clock cycle.

Figure 7A:
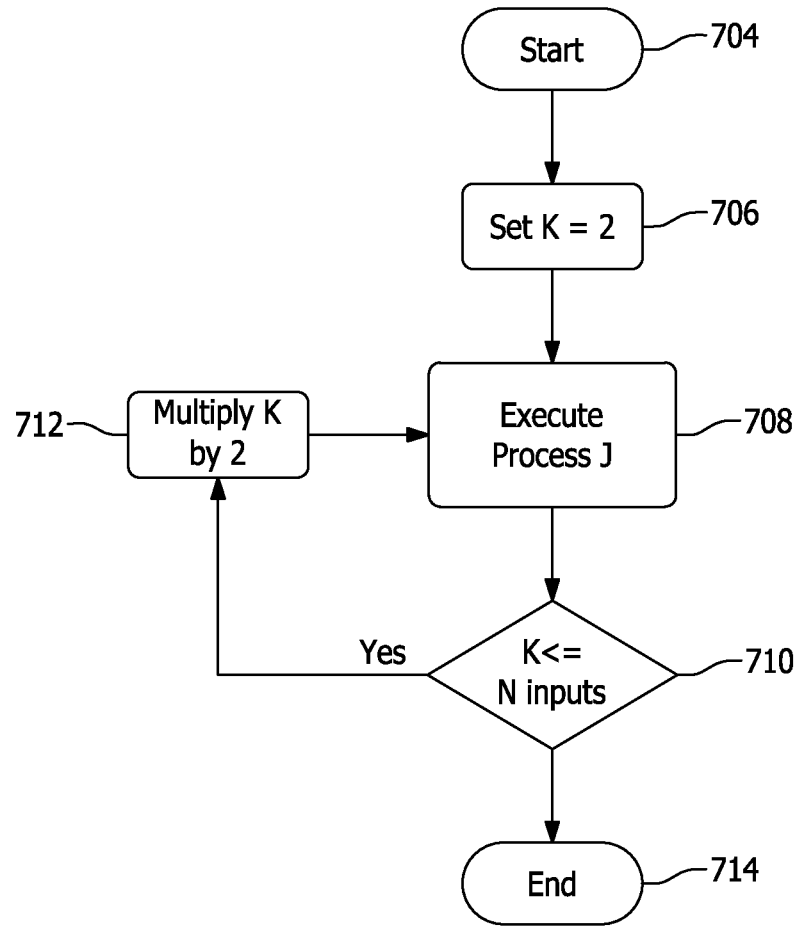
FIG. 7A, FIG. 7B, FIG. 7C, and FIG. 7D illustrate an exemplary flow diagrams of an example method of coherence engine processing.
Figure 7B:
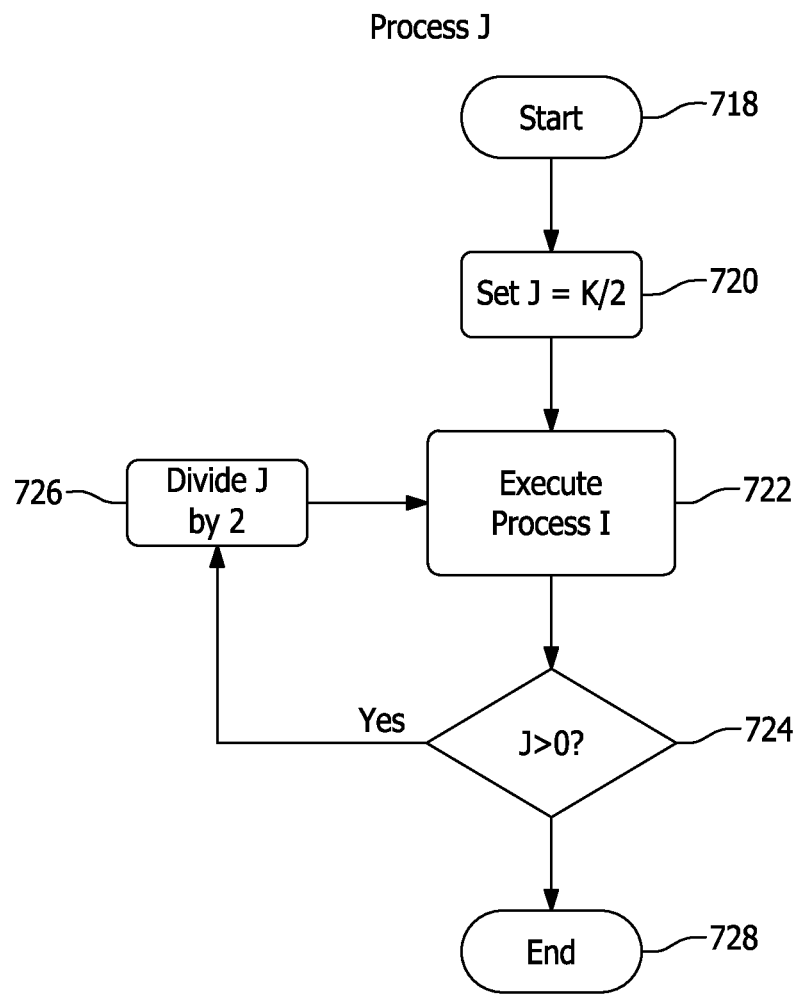

In reference to FIG. 7A, the first nested flow chart is shown. The coherency engine consists of a series of iterations of parallel sorting of inputs. Each iteration uses variables as indices to the entries to be sorted. The operation starts at a step 704. The first iteration uses a variable K that is initially set to 2 at a step 706. The variable K represents an indexing or counter variable that repeats log(N) times. The K value is passed on to the immediate Process J, at a step 708 for further processing. Process J shown in step 708 is shown in FIG. 7B. At a step 710, a determination is made whether K is less than or equal to the N number of inputs. The variable N represents the number of inputs. If the variable K is less than or equal to the number of inputs N, then at decision step 710 the operation advance to step 712. At step 712, the variable K is multiplied by two, and the operation returns to step 708. Alternatively, if at decision step 710 the variable K is not less than or equal to N, then the operation advances to step 714 and ends. Thus, the iteration repeats until the K variable reaches the total number of entries to be sorted.

FIG. 7B illustrates an example method of operation of process J which is shown in FIG. 7A. Process J uses a variable J that gets halved in value per iteration. At a step 718 the process starts and advances to step 720. At step 720 the variable J is set to the value K/2, which K is defined in value in FIG. 7A. Thereafter, at a step 722, the process I is executed. Then at a decision step 724 a determination is made whether the value of J is greater than zero. If at decision step 724 the value of J is not greater than zero, then the operation advances to step 728. At step 728 the operation ends. Alternatively, if at step 724 the value of J is greater than zero, then the operation advances to step 726, where the value of J is divided by 2. After step 726, the operation returns to step 722 as discussed above.

Figure 7C:
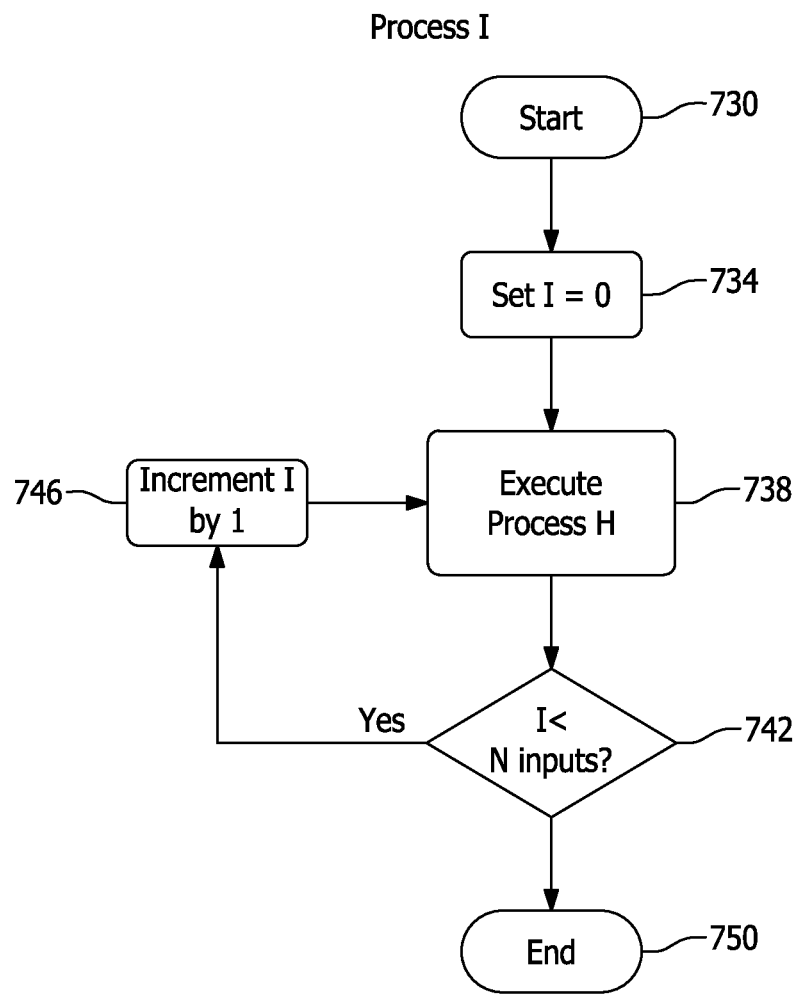
Figure 7D:
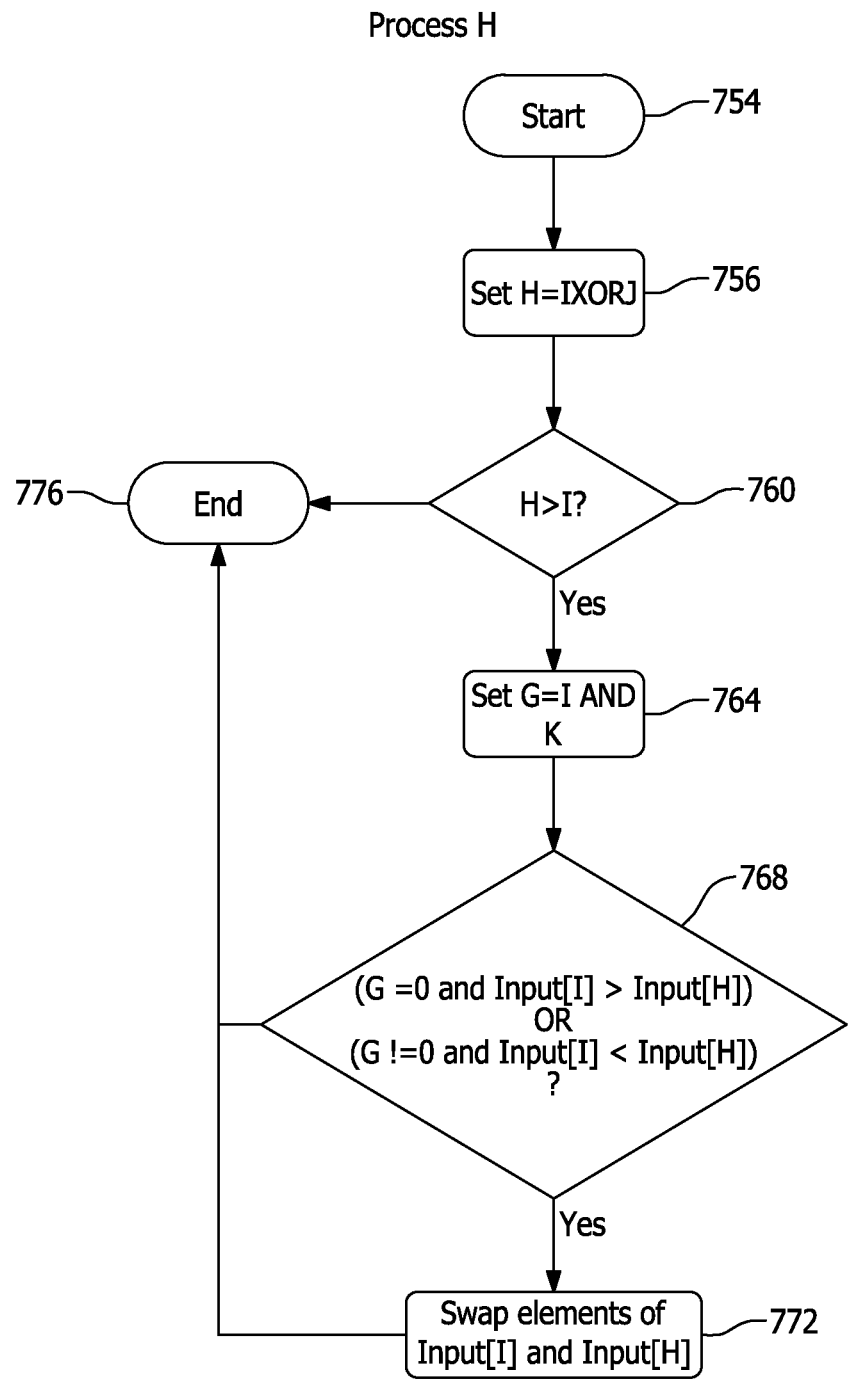

FIG. 7C illustrates an example method of operation of process I which is shown in FIG. 7B. The process I, shown in FIG. 7C, is the final loop and uses the values of variables J and K for sorting of the entries. The variables I, J, and K are used in process H, as discussed below. At a step 730, the operation starts and advances to step 734. At step 734, the value of variable I is set to zero. The operation advances to step 738, the process H is executed. Process H is shown in FIG. 7D. After step 738, the operation advances to decision step 742. At a step 742 a determination is made whether the value of I is less than the number of inputs N. If the value of I is less than the value of N, then the operation advances to step 746 where I is incremented by one, and the operation returns to step 738. If at decision step 742 the value of I is not less than the value of N, then the operation ends at step 750. In summary, process I maintains a variable I that is initially set to 0 and increments by 1 until the value reaches the total number of entries to be sorted. Per iteration, the values of variables I, J, and K are passed on to the sorting process, Process H.

FIG. 7D illustrates an example method of performing process H. This is but one possible method of operation. The process H, shown in FIG. 7D, sorts the current batch of entries using the values of variables I, J, and K. At a step 754, the operation starts and advances to a step 756. At step 756, the value of variable H is set to the outcome of variable I XOR'ed with the variable J. The variables I and J are calculated in FIGS. 7B and 7C. Then at a decision step 760, a determination is made if the value of H is greater than the value of I. If not, then the operation advances to step 776 and the operation ends. Alternatively, if at decision step 760 the value of H is greater than the value of I then the operation advances to step 764. At step 764, the value of variable G is set to the value of I AND'ed with the value of K. Then at a decision step 768, a determination is made based on two part analysis, which is a comparison of entries of indices I and H. At decision step 768, If the value of G is 0 and the entry of index I is greater than the entry of index H, then the operation advances to step 772, element entries I and H are swapped. Similarly, if at decision step 768, if the value of G is not 0 and the entry of index I is less than the entry of index H, then the operation advances to step 772, and element entries I and H are swapped. Alternatively, if the relationships of step 768 are not true, then the operation advances directly to step 776 where the process ends, bypassing step 772.

It is also contemplated that alternative methods and structures may be provided to perform ray coherence processing. In one embodiment, active batches of rays may be pulled from DRAM into cache, placed strategically close to or efficiently accessible to ray-box/tri testers that are running intersection tests on rays inside active batches. These testers produce unsorted intersection results, which may be placed back in cache as processed ray batches are removed.

The acceleration structure generation engine updates the previously generated hierarchy based on intersection hits or misses, and an SCP (system control processor) may reorganize, reprioritize, and reconfigure the system on chip (SoC) to maintain maximum utilization. Once unsorted intersection results are stored in cache for one or more ray batches, the ray batching engine batches intersection results based on new parameters (generated internally), such as associated materials or data provided by the acceleration structure. These sorted intersection results replace unsorted results in the cache and are fed through the ray feeder into shader cores, where pixels may be drawn and a raw frame may be outputted into cache. If the application has requested image denoising, a matrix multiplication engine, shader cores, or SCP denoises the image and outputs the final frame into DRAM.

At this point, intersection results, ray batches, the batch table, acceleration structure, and the initial ray pool may be evicted from cache and the process repeats for the next frame. The SCP retains access to the acceleration structure and batch table, allowing for frames that have similar geometry to avoid recalculating (and, in some scenarios, duplicating the ray tracing efforts) for geometry and cameras that have not changed.

This embodiment may operate in the following manner. The ray batching engine may operate independently from the rest of the ray tracing process but relies on data that would typically be provided by a preceding step. In the process defined herein, the preceding engine, the acceleration generation engine, generates a bounding volume hierarchy which may be used by the ray batching engine to sort and prioritize rays and generate batches. Without the ray batching engine, the SoC would still function, but performance would be limited with complex scenes.

In an exemplary embodiment, the present invention may be made by any suitable process. The system may be implemented in hardware. In some embodiments, software may be used for monitor data processing, controlling data input and output, or other functions that complete the requisite tasks and provide the user with the useful tool described herein, without slowing processing. In some embodiments, the solution is designed and implemented in an advanced silicon process.

In an exemplary embodiment the system may work in the following manner. Engines described herein may be implemented in hardware to accelerate the ray tracing process. A user may generate synthesizable code defining the core functions of each engine and connecting them together through a NoC (network on chip) or other interconnect, arrange the blocks on a physical die, and verify and produce the SoC. The blocks like the shader cores, SCP, and caches may implemented in hardware.

It is preferred that components in the ray tracing pipeline are configured to achieve maximum performance on complex scenes. The process apparatus being configured in hardware accelerates the function.

The ray batching engine may be used in multiple parts of the ray tracing process, as demonstrated here. In the future, modifications to engines used in the process may increase performance in specific scenarios. Similarly, the AI denoising step may be executed by multiple engines, depending on various factors including other workloads on the SoC, the complexity of the denoising, and whether or not the user has requested the step.

In an exemplary embodiment, the system may be used in the following manner. The ray batching engine operates transparently to the user. The user can supply basic parameters about the number of rays desired, the target resolution, AI denoising configuration, and scene geometry. The system may run through the pipeline automatically, executing the right steps and returning a finished image that matches the supplied parameters.

A user may supply these parameters and geometry through a software layer running on a CPU-based host machine or bypass the host system and provide data directly on the SoC. A network of SoCs directly connected may also receive data from SoCs in the network, so the user would only be required to maintain control over and provide data to one SoC.

In an exemplary embodiment, the ray batching engine is initially used to extract coherence and generate batches of rays from a ray pool. In the future, it may be used in other steps of the ray tracing process.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A ray tracing system comprising:
   one or more memories configured to store data used by the ray tracing system;
   one or more memory interfaces configured read and or write data to the one or more memories; and
   a ray tracing engine comprising:
      one or more ray generation modules configured to;
         generate ray data defining rays;
         output the ray data to one or more intersection testers; and
         in response to determining that the one or more intersection testers are unavailable, pause generation of the ray data;
      one or more acceleration structure generators configured to process geometry data that is stored in the one or more memories to create an acceleration structure based on the geometry data;
      the one or more intersection testers configured to compare the ray data to the acceleration structure to determine which rays intersect which elements in the acceleration structure and generate secondary ray data, such that the secondary rays represent reflections; and
      a spatial coherence engine configured to sort the secondary rays.

2. The system of claim 1 wherein the one or more ray generation modules, the one or more acceleration structure generators, and the one or more intersection testers are configured in hardware.

3. The system of claim 1 wherein the geometry data defines a scene within a frame.

4. The system of claim 1 wherein the acceleration structure generator generates a tree structure from the geometry data to reduce processing time of the intersection testers.

5. The system of claim 1 wherein at least one of the one or more memories is a cache memory.

6. The system of claim 1 wherein the acceleration structure is an octree that supports multiple types of primitives.

7. The system of claim 1 wherein the spatial coherence engine is configured to sort the secondary rays based on at least one of an origin of the secondary ray, a direction of the secondary ray, a termination point of the secondary ray, or a length of the secondary ray.

* * * * *